US008695045B2

(12) United States Patent
Jackson et al.

(10) Patent No.: US 8,695,045 B2
(45) Date of Patent: Apr. 8, 2014

(54) ADVANCED EVENT TRIGGERING

(75) Inventors: Keith Andrew Jackson, Hillsdale, NJ (US); Michael George Duemo, New York, NY (US); Michael P. Slavik, Middletown, NJ (US); Stephen J. Asay, Princeton Junction, NJ (US); Marcel Bautista, Hillsborough, NJ (US)

(73) Assignee: NBCU University Media, LLC, New York, NY (US)

( * ) Notice: Subject to any disclaimer, the term of this patent is extended or adjusted under 35 U.S.C. 154(b) by 22 days.

(21) Appl. No.: 13/171,266

(22) Filed: Jun. 28, 2011

(65) Prior Publication Data

US 2013/0007815 A1    Jan. 3, 2013

(51) Int. Cl.
*H04N 7/20*    (2006.01)

(52) U.S. Cl.
USPC .................................. 725/63; 725/68; 725/70

(58) Field of Classification Search
USPC ................................................. 725/63, 68, 70
See application file for complete search history.

(56) References Cited

U.S. PATENT DOCUMENTS

| | | | |
|---|---|---|---|
| 6,002,393 A | 12/1999 | Hite et al. | |
| 6,993,789 B1 * | 1/2006 | Sezan et al. | 725/142 |
| 2005/0015816 A1 | 1/2005 | Christofalo et al. | |
| 2005/0229225 A1 * | 10/2005 | Klausberger et al. | 725/112 |
| 2006/0130120 A1 * | 6/2006 | Brandyberry et al. | 725/136 |
| 2008/0309759 A1 * | 12/2008 | Wilson et al. | 348/143 |

FOREIGN PATENT DOCUMENTS

WO          02063426          8/2002

OTHER PUBLICATIONS

O'Grady et al., "Real-time switching of MPEG-2 bitstreams", Internationai Broadcasting Convention, Sep. 12, 1997, pp. 166-170, Amsterdam, The Netherlands.
European Search Report for Application No. EP12174163, dated Dec. 10, 2012.

* cited by examiner

*Primary Examiner* — Kieu Oanh T Bui
(74) *Attorney, Agent, or Firm* — Fletcher Yoder, P.C.

(57) ABSTRACT

An event trigger data string is formulated and added to digital content for distribution to an audience via broadcast, satellite, cable or any other technology. The event trigger data string includes identification of an event source, identification of an operation to be performed, and a payload. A controller reads the data string and outputs a command to an appropriate event source for alteration of a digital content stream based upon the identified operation. The payload may, for example, identify an advertisement or notice to be spliced into or out of the digital content stream. Such event trigger data strings may be added to many different digital content streams, and a router or switching component may distribute the streams to systems that disseminate them to the audience. The technique enables interaction with different event sources, and allows command of multiple different operations by these event sources.

20 Claims, 2 Drawing Sheets

Figure 2:
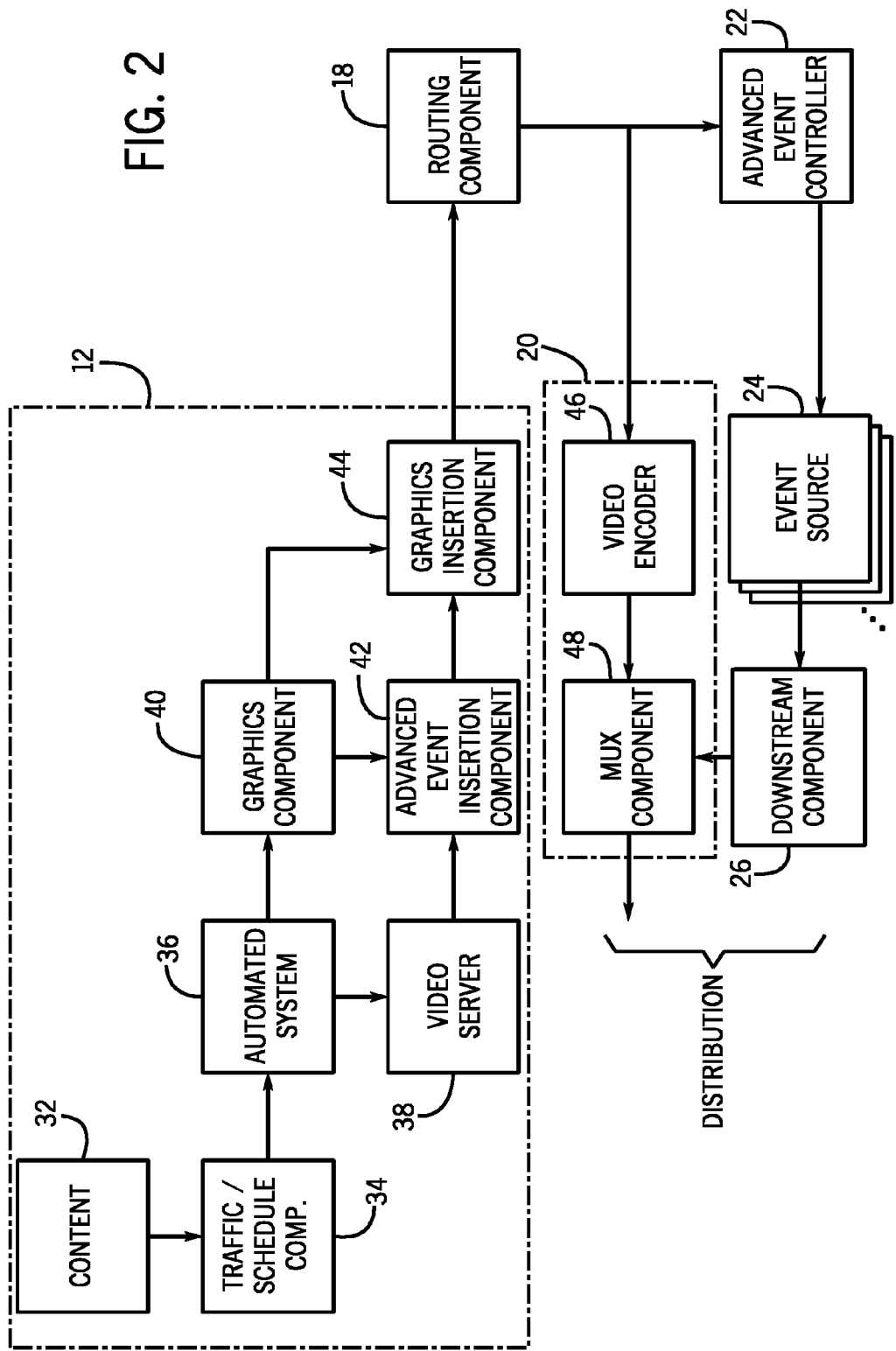

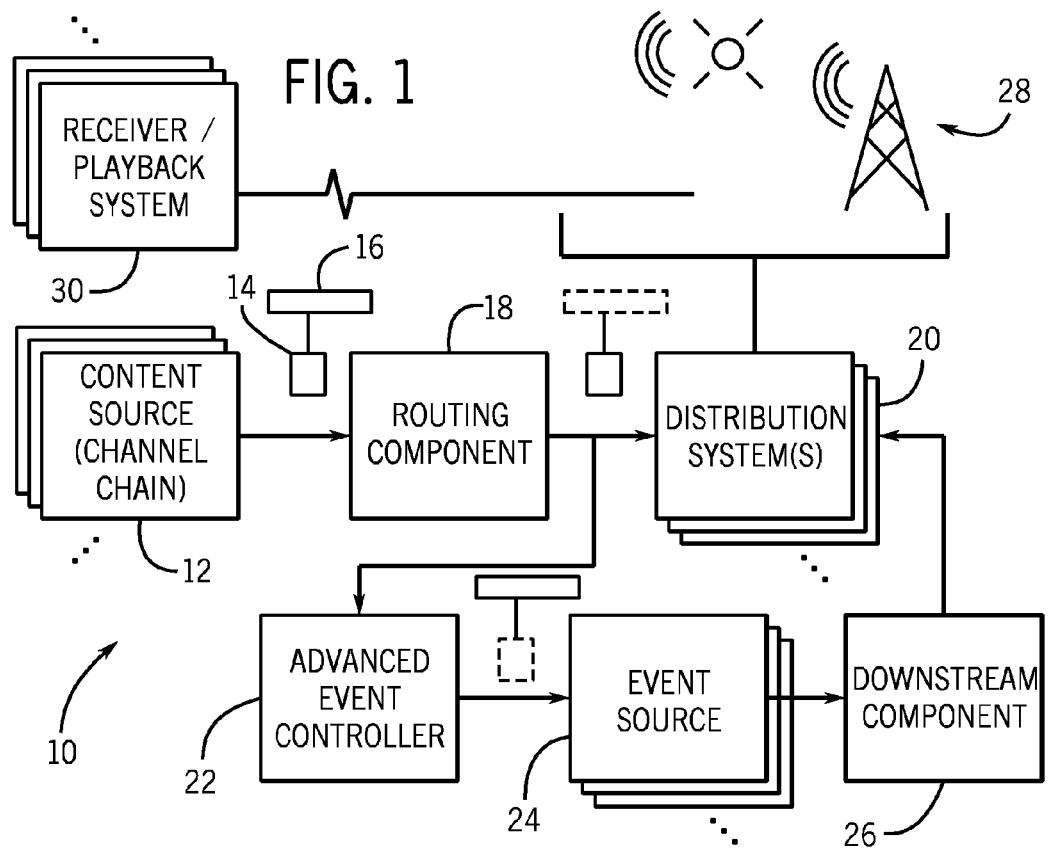
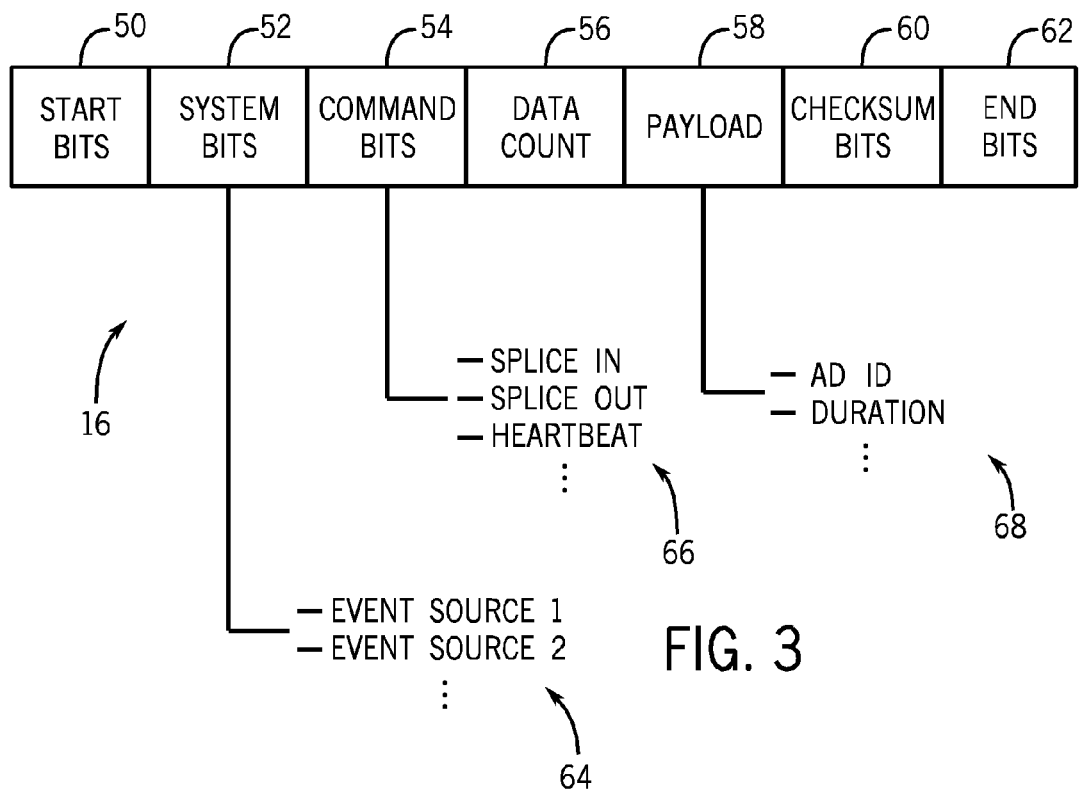

ADVANCED EVENT TRIGGERING

BACKGROUND

The invention relates generally to content distribution, including distribution of base content and additional content and/or information by means of events triggered by code in the base content.

A wide range of techniques have been developed for content distribution that allow for some flexibility in replacement, addition or other manipulation of selected portions of base content. For example, conventional television programming and similar content may be disseminated via the airwaves, satellite transmission, cable transmission, Internet and other network delivery, and so forth. The content delivered is typically pre-programmed and often includes base content (e.g., the underlying programming of interest to the audience) assembled with additional content, such as scheduled advertisements, public announcements, and the like. Such content selection, assembly and distribution are commonly performed by a particular provider, such as a television network, cable provider, or other source. Other entities, mainly downstream in the distribution chain, then disseminate and deliver the content to potential audiences.

For many reasons, however, it is quite often desirable to allow for certain portions of the base content and/or the additional content to be replaced with other material, or to allow material to be added to the assembled content stream. For example, television programming may include underlying program content, and certain advertisements, program notices, and so forth, sold or desired by the provider (e.g., a network). The network may work cooperatively with local or regional entities (e.g., affiliates), however, to allow for certain advertisements and announcements to be sold to the benefit of these entities. The content provided by these entities can then be inserted into the provided content at the time of delivery, such as replacing a default advertisement or announcement.

Mechanisms for cuing such insertion or replacement include designating "events" in the content stream, such as by tone cues or other triggers. The entities that perform the insertions or replacements will then monitor the content stream for such event triggers, and perform the insertion or replacement when the triggers are detected. Such techniques are common, for example, in providing "ad avails" for local television affiliates, allowing a revenue stream to be realized by the affiliates by selling advertisements, providing public services via announcements, and so forth.

Such techniques, while effective, tend to be quite simple, and allow for somewhat limited in terms of the options for the selection, provision and range of events that may be triggered. That is, many such systems may be designed to operate with a single data transfer protocol, allow for very basic events to be triggered (e.g., ad avails), and may not permit multiple suppliers or downstream content providers to participate in the insertion or replacement of content.

There is a need in the field for techniques that will provide greater flexibility to the providers of basic content and providers of inserted or replacement content via event triggers. Such techniques may allow for a wider range of options in terms of content and a much greater flexibility in the audiences that may be served, as well as improvements in the quality and specificity in the targeting of interested audiences.

BRIEF DESCRIPTION

The present invention provides a method for distribution of digital content. The method may include formulating event trigger data string including an identification of an event source, identification of an event command, and a command-dependent payload. The event trigger data string is then added to a digital content stream. The digital content stream is then transmitted with the event trigger data string for commanding an activity related to the digital content stream based upon the event source identification, the event command identification, and the command-dependent payload. The event trigger data string may be read by a control component that issues commands to one or a plurality of event sources for altering the content stream on one or multiple ways, all based upon the information contained in the event trigger data string.

The invention also provides a system for distribution of digital content. The system comprises an event trigger insertion component configured to add an event trigger data string to a digital content stream. The event trigger data string includes an identification of an event source, identification of an event command, and a command-dependent payload. An event trigger control component is configured to receive the digital content stream with the event trigger data string, and based upon the event trigger data string, to output a command to an event source for an activity related to the digital content stream.

Still further, the invention offers a novel event trigger data string stored in a non-transitory computer medium. The event trigger data string comprises an identification of an event source, an identification of an event command, and a command-dependent payload.

DRAWINGS

These and other features, aspects, and advantages of the present invention will become better understood when the following detailed description is read with reference to the accompanying drawings in which like characters represent like parts throughout the drawings, wherein:

FIG. 1 is a diagrammatical view of an exemplary content distribution system that utilizes an advanced event trigger scheme for providing supplementary content to basic content in accordance with aspects of the present disclosure;

FIG. 2 is a somewhat more detailed representation of the system of FIG. 1, illustrating certain functional components of the system in a presently contemplated embodiment; and FIG. 3 is a diagrammatical representation of an exemplary data structure intended to be used in a protocol for providing advanced event triggers from one or more channels or content streams to downstream providers of supplementary content.

DETAILED DESCRIPTION

Turning now to the drawings, FIG. 1 represents an exemplary content distribution system 10 incorporating an advanced event trigger technique in accordance with the invention. As illustrated, the system will include one or more content sources which may also be termed channel chains 12. These content sources may, for example, comprise conventional television broadcast networks, satellite broadcast systems, cable providers, movie and pay-per-view providers, and so forth. Indeed, any source of digital content may serve as the content source. Moreover, the content sources may be multiple within a single organization. That is, a provider such as a television network may offer a number of different programming options simultaneously and in parallel. Such programming options may comprise, for this entity, multiple channel chains which are assembled, processed, and disseminated in parallel for interested audiences. The content sources 12 provide content in which a string of data or data structure has been added for the advanced event trigger techniques described below. In the illustration of FIG. 1, the basic content 14 is illustrated as including the event data string 16. While represented separately, in the presently contemplated embodiments, the event data will be incorporated into or embedded in the basic content data. Several techniques for such embedding are presently contemplated, and are mentioned below.

The basic content 14 and event data string 16 are provided to a routing component 18. This component, which may include various computers, servers, switches, and the like, served to transmit the channel chain content and event data to one or more downstream distribution systems as indicated by reference numeral 20. Such distribution systems may allow for a wide range of delivery technologies, and multiple such distribution systems, each utilizing the same or different technologies may be employed. For example, existing technologies may include conventional broadcast over airways, satellite transmission, cable transmission, transmission of various physical media (e.g., optical fibers), Internet transmissions, and so forth. As illustrated in FIG. 1, the basic content and event data may both be delivered to the distribution systems although of primary interest to the distribution systems would be the basic content. The event data is illustrated in broken lines as being delivered from the routing component 18 to the distribution systems 20, although in practice the event data may remain attached to or embedded within the basic content data.

The data stream from the routing component to the distribution systems is also delivered to an advanced event controller as indicated by reference numeral 22. This controller is designed to receive the one or more feeds of content, and to provide control data output to one or more event sources 24. That is, the advanced event controller reads the event data from the content stream and provides commands, which may take the form of instructions and/or data to the event sources 24, based upon the data encoded in the event data portion. For example, the advanced event controller may present data as Telnet data sessions. The advanced event controller may output the control data (and any other data transmitted) via an Internet protocol (IP).

The event sources may comprise, for example, one or more enabled vendors or secondary event providers that receive the command packet from the advanced event controller and output data for downstream components 26 that insert supplementary data or content into the channel chain data streams. In a presently contemplated embodiment, for example, the event sources may provide graphics, advertisements, replacement content, additional related content, offers, and so forth to the interested audiences. Moreover, in a presently contemplated embodiment, the event sources may output messages in accordance with one or more known messaging protocols, such as protocols known under the designation SCTE 35 or SCTE 104. As discussed below, the event sources 24 may be contracted by the content source 12, distribution system 20, or any other interested party to provide particularly tailored supplemental content, such as content designed for specific geographic regions, specific timeslots, specific interested audiences, particular products or services, and so forth.

Based upon the received content from the routing component 18 and the supplemental content received from the downstream component 26, the distribution systems 20 disseminate the content via any one or multiple current technologies, such as, in illustrated embodiment, conventional broadcast mechanisms, satellite delivery systems, cable and Internet delivery systems, and so forth. Such technologies might include, in addition, cellular telephone networks, private networks, or any current or future developed delivery technologies. The combined content is then received by interested audiences via receiver/playback systems 30. These may include any desired types of systems, such as conventional televisions and set top boxes, Internet-ready televisions, computers, tablet devices, handheld devices of various types, telephones, and so forth. It should also be noted that, while the illustration of FIG. 1 focuses on real time near-real time content delivery, the delivery mechanisms themselves could also include delayed delivery, on-demand delivery, one-to-one delivery, and so forth. It should be noted that the distribution systems 20, the advanced event controller 22, the event sources 24 and the downstream components 26 may be provided in completely different entities, separate and distinct from the components and entities upstream of the routing component. They may be, themselves, in some cases grouped, or may also be completely separate and distinct, and may be in locations different from one another and different from the entities and components upstream of the routing component.

Regarding the combination of supplemental data or content, or any activities commanded by the advanced event trigger as discussed below, these operations may be performed in accordance with current techniques (or others to be developed). In particular, adding or replacing advertisements, notices, graphics, and so forth may be carried out by any entity prior to dissemination to the audience, such as broadcast, cable, or satellite affiliates, local or regional suppliers, and the like in accordance with generally known technologies. Such entities may be designated, such as in destination data that may be included in the advanced event trigger data, or referenced by the event sources, such as based upon the payload contained in the advanced event trigger data.

It should be noted that in the overall system configuration illustrated in FIG. 1 numerous individual entities may cooperate in the provision of the basic content, the event triggers, the event data (e.g., supplemental data or content) and the distribution of the content and data. In a presently contemplated embodiment, for example, a single content source 12 may provide multiple channel chains, such as 48 parallel channel chains in which audio, video, graphics, and other components may be combined. These channel chains are provided in data streams that may have different event data combined into them to permit different supplemental content to be provided by virtue of different event sources. The event data in each stream may also be different in terms of the particular types of supplemental content, the operations performed (e.g., splicing in, splicing out, replacement, etc.), as well as for the combination of different timeslots for the events. In any cases, the triggers will be associated with the underlying or basic content or programming and follow that programming in terms of time, target audience, and so forth.

Moreover, in presently contemplated embodiments, the content source 12 provides data streams to the routing component 18 in accordance with various codecs, protocols, and so forth. In currently contemplated embodiments, the data stream will be in accordance with high definition video standards that include both audio and video components. The routing component 18 may comprise, for example, bypass switches, routing switches, and so forth that perform internal routing to forward the various channel chain data streams for distribution. In certain systems, the routing component may allow for break-in replacement of certain programmed content with other programmed or unprogrammed (i.e., not a priori scheduled) content. This may occur, for example, where one television program is replaced by another, or with special news updates based upon developing news items. The routing component may provide primary and backup systems and may offer manual or automated channel chain selection. Similarly, the distribution systems 20 may be multiple, and in a presently contemplated embodiment 24 channels are delivered for distribution. In all of these embodiments, it should be borne in mind that the content sources, the routing component, and the distributions systems may be part of the same business entity, or may be different entities, or linked by contractual arrangements. Similarly, the advanced event controller 22 may be present and or controlled by the content source, for example, while the event sources 24 may be entirely different entities, and multiple different entities may each represent an event source that works under contractual or other arrangements for providing the supplemental content based upon the advance event triggers.

It should also be noted that while, in general, the event sources may perform some alteration of the content stream, a wide range of activities may be commanded related to the content stream. For example, as discussed in the present disclosure, the content stream may be altered, such as by splicing supplementary content into the content stream, or by splicing content out of the stream. This may include, for example, addition or replacement of an advertisement, announcement, notice, graphic, product and/or service offer, and so forth. However, other events may be commanded that do not alter, or that do not directly affect the content stream. For example, the event source may be triggered to synchronize the transmission or delivery of other content, such as Web-based content to the same receiver/player or to a different device (e.g., a personal computer, a tablet computer, a smartphone, or any other device) coordinated with the content stream in some way. In other applications, the commanded event may simply be the identification and logging of the content stream, such as for audience or content interest evaluation, product placement evaluation and tracking, and so forth. Still further, it may be useful to enable simple "heartbeats" in which the entities involved, internally or in cooperation, test and verify the functionality of the event triggers in the content stream.

FIG. 2 is a somewhat more detailed illustration of the system of FIG. 1, showing certain of the functional components that may be included in the system. As indicated above, the content source 12 draws from and distributes content, which may be stored in a content library as indicated at reference numeral 32 in FIG. 2. For established organizations, this content may be resident within the organization, such as stored in large digitized libraries. However, the content may be stored and available separate from the entity, and drawn upon as programming as assembled for distribution. In the embodiment shown in FIG. 2 the content source also includes a traffic/schedule component 34. This component may comprise one or more computers that are programmed to draw upon particular content, as well as advertisement, announcements, as so forth that will be assembled for the desired content or program offering. An automation system 36 provides real time control for commanding video server 38 to serve the video portion of the content. This video portion will typically also include the audio portion in multi-media content. Although illustrated as being routed through the traffic/schedule component 34, in a practical application, the content library 32 or any extraneous content repositories that may be in direct connection with the video server 38 that draws the content from the library for assembly with other elements of the content stream. The automation system 36 also provides instructions for coordinating the insertion of graphics components as indicated by reference numeral 40. Such graphics may include, for example, logos, advertising and information banners, and so forth. The content provided by the video server and the graphics provided by the graphics component are then forwarded to an advanced event insertion component 42. This component, which may include one or more further programmed computers, inserts code defining the event data into the video/graphics content stream. Additional details regarding a presently contemplated embodiment for the event data are described below. The combined video content and advanced event data are then forwarded to a graphics insertion component 44 which inserts any graphics as commanded by the graphic component 40. The graphics insertion component 44 stores and inserts graphics into the content stream.

The combined content data stream including video, audio, graphics and the advanced event data are then forwarded to the routing component 18 as described above. This routing component 18 advances the combined data stream to the advance event controller 22 as well as to the distribution system 20. Depending upon the type of distribution system, the technology employed, and so forth, this may include a range of functional components, such as programmed computers, associated memory, signal processing circuitry, and so forth. In the illustrated embodiment, the distribution system includes a video encoder 46 that may encode the data stream in accordance with existing codecs, protocols, and so forth for dissemination via airways, satellite transmission, cable and Internet transmission, and so forth. The video encoder 46 may feed the encoded data to a multiplexing component 48 which allows for multiple channels to be delivered in parallel. The resulting data may be provided for dissemination via the selected technology, such as via conventional uplinks. It should be noted, however, that these components may include servers for transmitting the content via IP standards, such as on a one-to-one basis rather than via conventional multitask techniques. As noted above, the advanced event controller 22 is linked to one or more event sources 24 and provides control signals for commanding these event sources to perform certain operations, insert content, splice out content, and so forth. In operation, these event sources may receive command packets in accordance with an IP standard and output messages, such as SCTE 35 or 104 messages over Ethernet or other networks to instruct the downstream components 26 to insert supplemental data, extract data, or perform other operations as defined by the advance event trigger data.

FIG. 3 illustrates an exemplary presently contemplated data structure for the event data string 16. It should be noted that the data structure is designed to perform certain operations, including delivery of a meaningful payload, although some or all of these operations may be altered, and some of the operations may not be included, depending upon the particular application as described below. It should also be noted that various delivery techniques may be used for providing the event data, such as serial protocols (e.g., RS232), IP standards, markup language standards (e.g., XML), packets are conforming to vertical blanking standards (e.g., vertical ancillary data or VANC packets), and so forth. For example, if inserted into an IP data stream, a source IP address and port number may be identified. Similarly, RS232 data may be inserted into a VANC packet. These and other techniques may be readily recognized or developed in the future by those skilled in the art.

In the illustrated embodiment, the event data includes start bits 50 to indicate that the succeeding data will be advanced event data to be recognized by the advance event controller for the basis of instructions to the event sources. The start bits, which may, for example, be two bits following the ASCII specifications, allow for control characters that aid in framing the packet. These bits are followed by system bits 52 when desired. The system bits, which may also include two ASCII characters, designate a particular event source 24 to which commands from the advance event controller should be communicated. It should be noted that the present technique may be used with a single event source, and in such cases, the system bits may be eliminated or used for other purposes. However, in the illustrated embodiment the presence of the system bits provides enhanced flexibility to the extent that multiple event sources as indicated by reference numeral 64 may be addressed. Similarly, command bits 54, which also include two ASCII characters, allow for encoding specific operations to be performed by the event source. A wide range of these may be developed, and in presently contemplated embodiments, these may include splice in operations, splice out operations, heartbeat operations as indicated by reference numeral 66, and so forth. As with the system bits, it should be noted that the command bits allow for multiple different types of operations to be commanded. However, in a simpler implementation, the same structure may be used with a single operation, such as for splicing in supplementary data or content. In such cases, the command bits may be dispensed with or used for other purposes. However, as with the system bits, the command bits allow for enhanced operability to extent that they permit multiple different operations to be commanded.

A data count 56 may also be included, which may similarly be two ASCII characters to represent values, such as 0-255 in hexadecimal notation. These bits may be used to indicate the number of bytes in the payload. The data count is followed by the payload 58 which will comprise code that may define particular supplemental content that should be managed by the events source. That is, the payload may be command-dependent, and may include a string of bits, such as an ASCII string that defines, for example, an advertisement to be covered (e.g., replaced in the original chain data) as well as the duration. This "naming" and "duration" approach may, of course, be adapted for other purposes, or other contents may be provided in the payload. In a presently contemplated embodiment, for example, a 13-character advertisement identification is provided along with a duration notation in tenths of a second encoded in hexadecimal format. This and other information, or different information is encoded between the data count and the check sum bits 60 as indicated reference numeral 68. The check sum bits, which similarly may be two ASCII characters, may represent, for example, a desired number of least significant bits, such as 8, of the payload check sum. Finally, the data structure includes endbits, which similarly may be ASCII-conforming code to indicate the end of the structure.

It should be noted that the illustrated embodiment of the event trigger data string is intended to be exemplary only. Other data, or additional data may be included, and various orders or arrangements of the data may be made. The data may be compressed, codified or embedded into other data when desired, particularly according to any particular protocol used for its transmission. Moreover, when multiple different operations may be performed, these may be intended to be carried out based on commands from one or more controllers. While splice in and splice out commands are presently contemplated, as will be readily understood by those skilled in the art, other "commands" may allow for system troubleshooting and maintenance, such as simple system "heartbeats". All such operations are, in the present context, considered as "commands" or "operations" that can be specified in the event trigger data string. Similarly, as discussed above, a range of commands may be issued to event sources to perform operations that do not actually add to, draw from or otherwise alter the content stream, such as for synchronized or coordinated delivery of supplementary content, offers, and so forth, including to different devices and via different channels. The commands and activities may also be somewhat "passive" in nature, such as for identifying and logging operations only.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for distribution of digital content, comprising:
   formulating event trigger data string including an identification of an event source, identification of an event command, and a command-dependent payload;
   adding the event trigger data string to a digital content stream; and
   transmitting the digital content stream with the event trigger data string for commanding an activity related to the digital content stream based upon the event source identification, the event command identification, and the command-dependent payload.

2. The method of claim 1, comprising formulating a plurality of event trigger data strings, adding each event trigger data string to a different digital content stream, and transmitting the different digital content streams each with the respective event trigger data string for commanding an activity related to the digital content of the respective digital content stream based upon the respective event source identification, the respective event command identification, and the respective command-dependent payload.

3. The method of claim 2, comprising routing each digital content stream with the event triggers to at least one content distribution system.

4. The method of claim 3, wherein the content distribution system disseminates the digital content stream via at least one of an airwaves broadcast, a satellite uplink and a cable link.

5. The method of claim 1, comprising receiving the digital content stream with the event trigger data string, and based upon the event trigger data string, outputting a command to an event source for an activity related to the digital content stream.

6. The method of claim 5, wherein the event source to which the command is output is determined by the event source identification in the event trigger data string.

7. The method of claim 5, wherein the alteration of the digital content stream performed by the event source is determined by the event command in the event trigger data string.

8. The method of claim 1, wherein the event command comprises at least one of a splice in command, a splice out command or a heartbeat command.

9. The method of claim 1, wherein the payload comprises identification of an advertisement or notice to be spliced out of or spliced into the digital content stream.

10. A system for distribution of digital content, comprising:
   an event trigger insertion component configured to add an event trigger data string to a digital content stream, the event trigger data string including an identification of an event source, identification of an event command, and a command-dependent payload; and
   an event trigger control component configured to receive the digital content stream with the event trigger data string, and based upon the event trigger data string, to output a command to an event source for an activity related to of the digital content stream.

11. The system of claim 10, wherein the event trigger insertion component is configured to add event trigger data strings to multiple different digital content streams.

12. The system of claim 11, comprising a routing component configured to transmit to at least one content distribution system the different digital content streams each with the respective event trigger data string for commanding an activity related to the digital content of the respective digital content stream based upon the respective event source identification, the respective event command identification, and the respective command-dependent payload.

13. The system of claim 10, wherein the event trigger control component is configured to transmit commands to any one of multiple different event sources.

14. The system of claim 13, wherein the event source to which a command is output is determined by the event source identification in the event trigger data string.

15. The system of claim 10, wherein the activity related to the digital content stream performed by the event source is determined by the event command in the event trigger data string.

16. The system of claim 10, wherein the event command comprises at least one of a splice in command, a splice out command or a heartbeat command.

17. The system of claim 10, wherein the payload comprises identification of an advertisement or notice to be spliced out of or spliced into the digital content stream.

18. An event trigger data string stored in a non-transitory computer medium and comprising:
   an identification of an event source;
   an identification of an event command; and
   a command-dependent payload.

19. The event trigger data string of claim 18, wherein the event source identification identifies one of a plurality of event sources that may receive a command to alter a digital content stream.

20. The event trigger data string of claim 18, wherein the event command identification identifies one of a plurality of activities related to a digital content stream to be performed by an event source.

* * * * *

UNITED STATES PATENT AND TRADEMARK OFFICE
CERTIFICATE OF CORRECTION

| | |
|---|---|
| PATENT NO. | : 8,695,045 B2 |
| APPLICATION NO. | : 13/171266 |
| DATED | : April 8, 2014 |
| INVENTOR(S) | : Keith Andrew Jackson et al. |

It is certified that error appears in the above-identified patent and that said Letters Patent is hereby corrected as shown below:

On the Title page, in item (73), Assignee, delete "NBCU University Media, LLC, New York, NY (US)" and insert --NBCUniversal Media, LLC, New York, NY (US).--

Signed and Sealed this
Tenth Day of June, 2014

Michelle K. Lee
*Deputy Director of the United States Patent and Trademark Office*